Nov. 16, 1943.   L. W. YOUNG   2,334,301
TOOL-GUIDING APPARATUS
Filed Dec. 13, 1941   2 Sheets-Sheet 1

INVENTOR
LLOYD W. YOUNG
BY
ATTORNEY

Patented Nov. 16, 1943

2,334,301

UNITED STATES PATENT OFFICE 2,334,301

TOOL-GUIDING APPARATUS

Lloyd W. Young, Scotch Plains, N. J., assignor to The Linde Air Products Company, a corporation of Ohio Application December 13, 1941, Serial No. 422,817

22 Claims. (Cl. 266—23)

This invention relates to tool carriages and to track members therefor, and more especially to a blowpipe machine having an adjustable track adapting it to conform to plane, concave or convex surfaces.

The present machine is especially adapted for demolition and salvage work. For example, it frequently becomes necessary to disassemble large fuel-storage tanks having extended wall surfaces, smoke stacks, and similar structures either for replacement of some or all of its plate material, or to permit removing the structure in sections to a new location. In either event it is desirable to cut the encasing members, for example along horizontal and vertical lines to form rectangular plates or other regular shapes that are readily adaptable for subsequent use. The flame-cutting process is ideally adapted to this type of work because of the ease, rapidity, and precision with which the oxygen stream may sever ferrous-metal plates. Furthermore, by advancing a squaring-off cutting nozzle and a beveling nozzle in tandem along the desired path of travel, the plates may be cut and beveled in a single operation, thereby simultaneously forming the plate and preparing the plate edge for a subsequent welding operation.

However, in order to produce cuts formed to within the required close tolerances, the cutting and beveling or other nozzles must be propelled with machine-like precision along horizontal and vertical paths, and the nozzles must be maintained strictly at a constant distance from the workplate, as by a floating support or plate-riding device, thereby compensating for warpage or other irregularities in the surface of the work. Heretofore, no satisfactory device has been known which would propel a tool such as a blowpipe or nozzle block smoothly and accurately along the side walls and ceiling of tanks and other similar structures, to perform a demolition operation of the type already described. One of the principal obstacles to the development of such a device lay in the proper design of a track member adaptable to structures of various shapes and sizes and readily portable thereto, yet which would be sufficiently strong and rigid when set in position, to support and guide a blowpipe carriage properly along the desired path. Other obstacles lay in providing a positive drive arrangement cooperable with an adjustable track to advance the carriage at constant speed in either vertical or horizontal directions, and in providing mechanism for maintaining the carriage on the track in all positions and for urging the floating tool support into constant engagement with the work surface, even with the carriage travelling in inverted position. These and other obstacles have been met and successfully overcome in the development of the present machine.

Accordingly, the principal objects of the present invention are: to provide an improved tool-propelling carriage and track mechanism adapted to be shaped to conform to the configuration of the work surface; to provide an improved readily portable track member for use in supporting and guiding a blowpipe carriage, which track member may be arched or bowed along its length into a curve substantially parallel to the work surface; to provide on such a track member improved positive driving mechanism adapted to propel the carriage along the track at constant speed; to provide an improved arrangement for mounting a blowpipe carriage in interlocking relation on an adjustable track, and for securing the track firmly in any position to a workplate or other body; to provide in such an apparatus improved means for maintaining a floating tool holder in constant engagement with the work surface; and to provide an improved blowpipe carriage having a handle member which substantially surrounds and protects at least a portion of the drive mechanism. These and other objects will become more readily apparent from the following description and from the accompanying drawings disclosing one embodiment of the invention.

Generally speaking, the invention comprises an adjustable track T, having a continuous rail R, of generally flexible material and as indicated in the figures, of elongated form, which track may be spaced from the surface of a workpiece P, by a plurality of standoff members or legs L, spaced at intervals along the track T. Adjustable means A regulates the distance between adjoining legs L to arch the rail R into a curve substantially parallel to the work surface. A self-propelled carriage C having wheels W may be interlocked on the track T with positive driving mechanism for propelling the carriage along the track.

Figure 1:
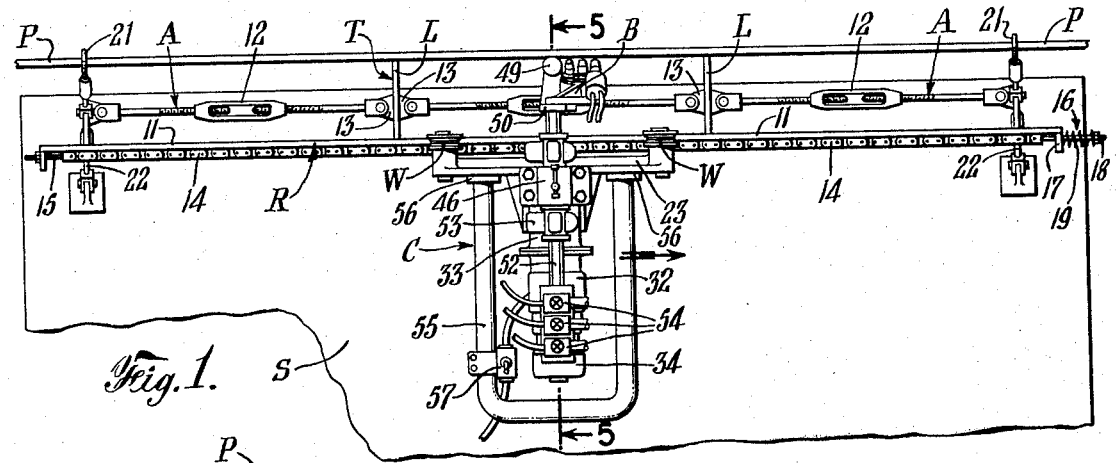
Figs. 1 and 2 are top plan and front elevational views, respectively, of the apparatus shown connected for horizontal travel along a straight vertical side wall.
Figure 2:
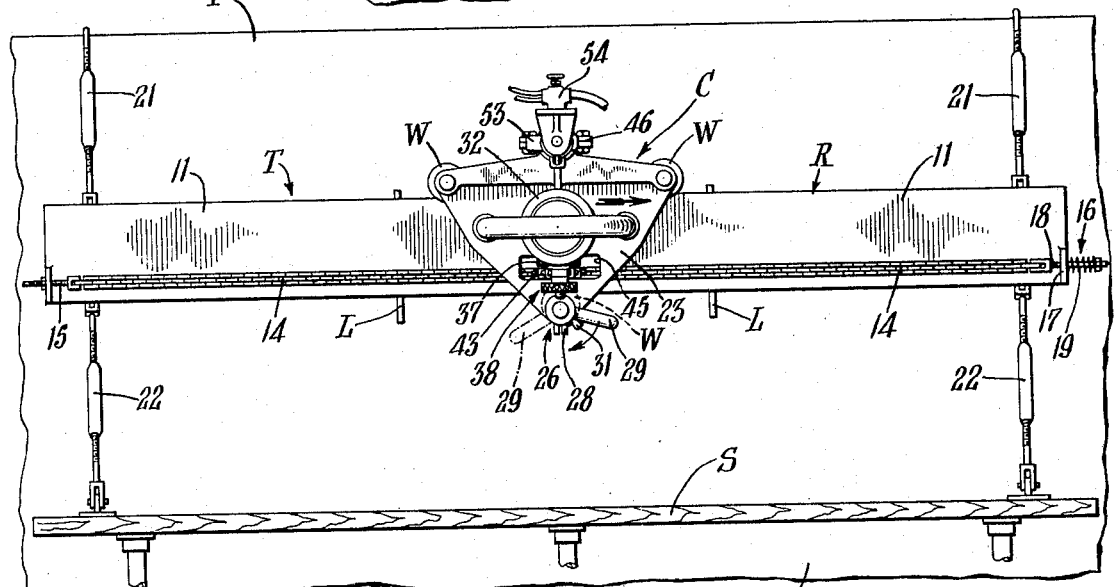
Figure 3:
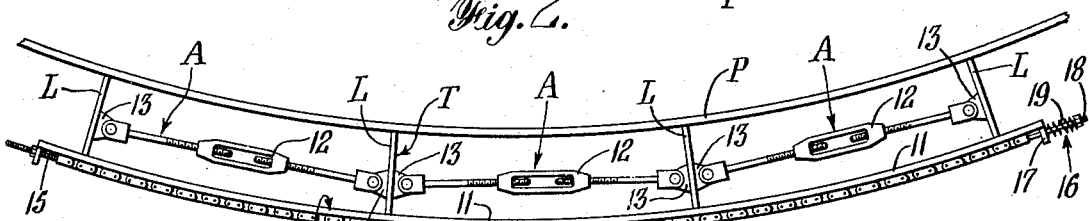
Figs. 3 and 4 are plan views of the improved track member, illustrating the manner in which the track may be arched from a straight position to a concave or convex position; and, Fig. 5 is a longitudinal sectional view, with certain parts in elevation, taken on the line 5—5 of Fig. 1 showing the improved carriage and track member in assembled position.
Figure 4:
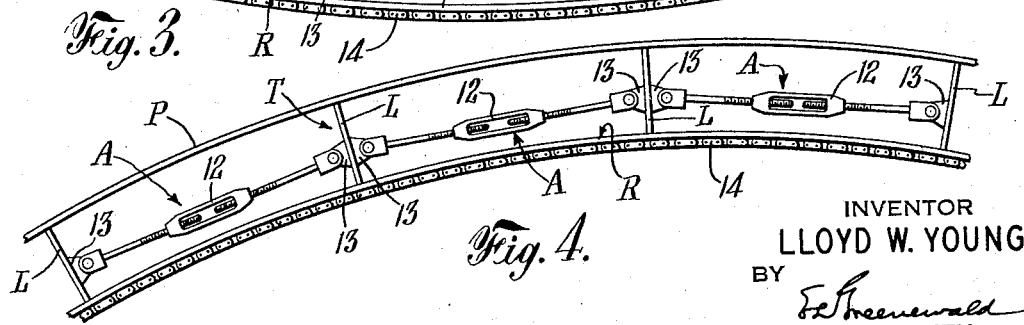
Figure 5:
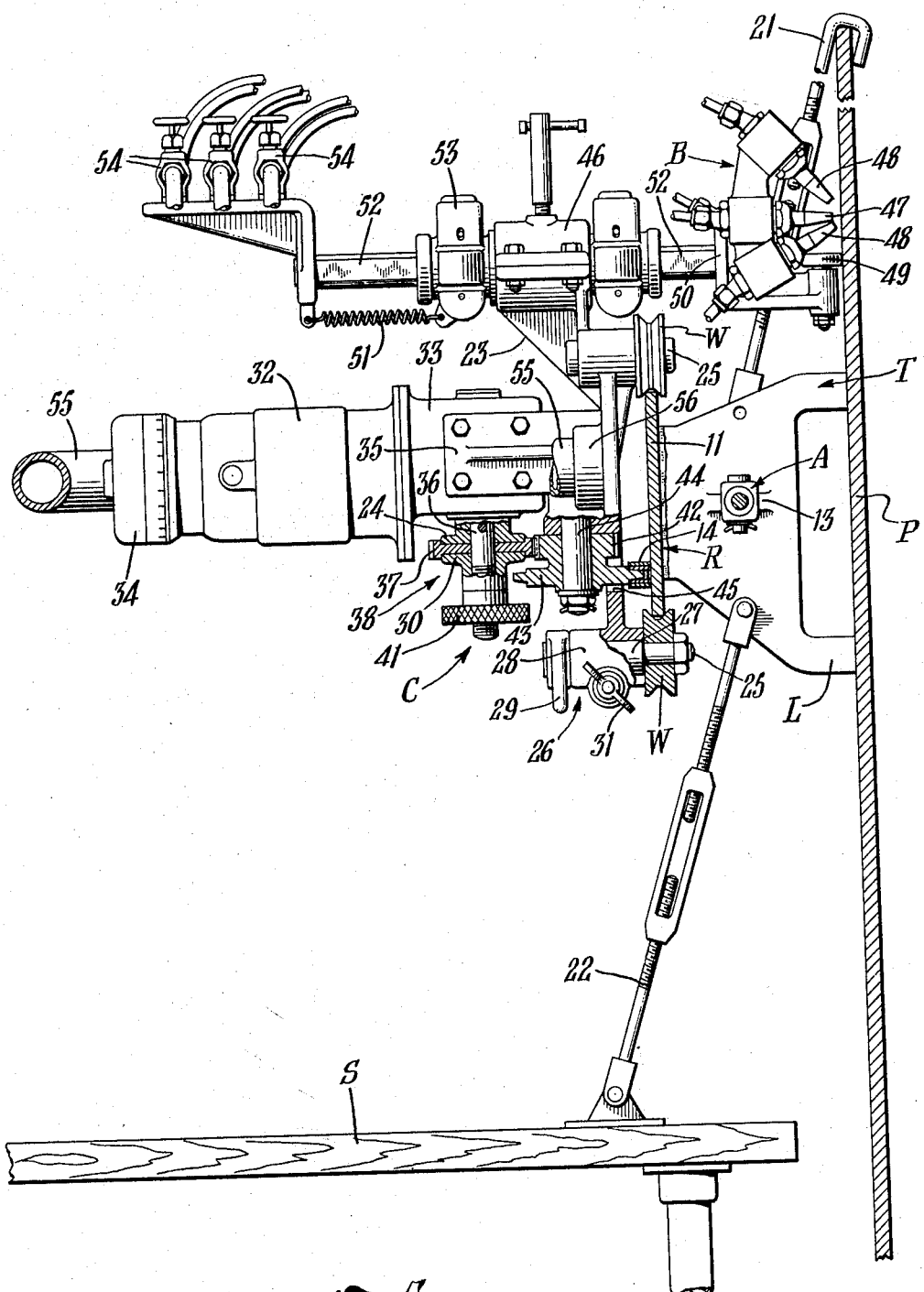

The improved track T comprises in effect a built-up beam which preferably normally may be straight as indicated in Figs. 1 and 2, which is sufficiently flexible as to be arched to a concave or convex position as generally indicated in Figs. 3 and 4 and yet which, when once adjusted, provides a rigid and sturdy support for the blowpipe supporting carriage C. The rail of the track T preferably comprises a generally flexible plate or strip 11, such as might be formed of metal, plastics, or wood. The legs L comprise flaring feet extending substantially at right angles from the plate 11 for engagement with the surface of the workpiece P to support the plate 11 substantially parallel to, and equidistant from, the worksurface. The legs L as indicated in the figures, will be of substantially equal length, and may be permanently attached to the rail R as by brazing, or may be detachably connected in any convenient manner. The adjustable means A is operative to vary the mean distance between adjoining legs L, thereby causing the plate 11 to arch or bow in an inner or outer direction, depending on whether the distance between the legs L is shortened or lengthened. Preferably, the adjustable means A comprises a strut such as a turn-buckle 12, extending between adjoining legs L along a zone intermediate the plate 11 and the workpiece P. The turn-buckle 12 is spaced from the workpiece sufficiently as not to interfere with a convex contour therein when the turn-buckle has been shortened to its extreme short position. The respective turn-buckles 12 are pinned or bolted to apertured lugs 13 formed on opposite sides of each leg L. While I have herein shown a strut as a turn-buckle capable of withstanding tensile and compressive stress, if the strut is always under tension it may take the form of a simple adjustable cable or stay.

A flexible rack such as a block chain 14 is mounted along the track T for engagement with a toothed drive member such as a pinion or sprocket on the carriage C. The chain 14 may be located at any suitable position, and preferably as close as possible to the track's neutral axis (about which the track bends or flexes), for example, against one face of the plate 11, as indicated in the drawings. The chain may be secured directly to the plate at one end as by an adjustable bolt 15, and may be provided with a spring-loading mechanism 16 at its opposite end, to allow the chain to yield slightly when the track is arched to a convex position. The mechanism 16 may comprise an apertured pad 17 mounted on the plate 11. A bolt 18 extends from the adjoining end of the chain 14 through the aperture in the pad 17. A compression spring 19 acting between the pad 17 and the free end of the bolt 18 maintains the chain 14 taut at all times.

The track T is portable and may be readily mounted upon the work in any convenient manner. Satisfactory results have been obtained with hangers 21 and braces 22 thus permitting the ready mounting or demounting of the device. The hangers 21 comprise adjustable rods extending upwardly from the legs L at each end of the track T so as to hook over the top edge of the workplate. The braces 22 may comprise adjustable members extending downwardly from one or more legs L to the stage or platform S supporting the operators. The hangers 21 may be sufficient to support the entire structure if the track is relatively short, since the entire structure is substantially rigid and the legs flare out at the bottom to provide a solid footing. However, if the track sags unduly, additional braces 22 or any other similar auxiliary supporting means may be provided at intermediate points. The hangers and braces may be shortened or lengthened as necessary to adjust the track to a horizontal or other desired position.

The carriage C comprises a base 23 of generally triangular shape. A grooved guide roller or wheel W is journalled to a pin 25 at each corner of the base 23 along parallel axes, so that the wheels engage the respective side edges of the plate 11, and thereby guide the carriage along the track T. A wheel-interlocking device 26 comprising an eccentric rod 27 connected to one of the pins 25 pivots within a split clamp 28. The rod 27 may be shifted through substantially 180° within the clamp 28 as by a locking lever 29, as shown in Fig. 2, causing the pin 25 to move toward and from the edge of the plate 11. Accordingly, the carriage C may be interlocked on the track T by locating the fixed wheels on one edge of the plate 11 and shifting the device 26 from the remote position to the edge-engaging position, in which position the device 26 may be locked as by a clamping thumb screw 31.

The carriage is propelled in any conventional manner, for example, by means of an electric motor 32 and speed reduction unit 33. The speed may be varied with a conventional governor 34, mounted, for example, at one end of the motor 32. The motor and transmission system may be held on the base 23 by one or more brackets 35. A drive shaft 36 extends outwardly from the speed-reduction unit 33. A pinion 37 is mounted loosely on the shaft 36 but may be secured tightly to the shaft by a clutch 38 comprising a fixed flange 24 and a movable flange 30, between which the pinion may be compressed by a clutch knob 41. A gear 42 meshes with the pinion 37 and rotates a drive member such as a pinion or sprocket 43 rotatable with the gear 42 on a spindle 44. The sprocket 43 extends through an aperture 45 in the base 23 for operative engagement with the chain 14.

It will be observed that the machine may be free-wheeled into initial operating position when the clutch knob 41 is loose. The machine may be propelled positively along the track T by setting the motor in operation at the desired speed and tightening the clutch knob 41 so as to lock the pinion 37 to the drive shaft 36. By interlocking the carriage on the track T and by providing a positive drive mechanism, the carriage may be propelled at a constant speed along either horizontal or vertical paths, and even when the carriage is suspended from an overhead track.

A suitable tool-mounting means such as a split clamping sleeve 46, may be formed integrally with the base of the carriage C to support a tool holder 50. Any suitable tool, such as a blowpipe or nozzle block B, may be mounted on the holder 50 in operative engagement with respect to the workpiece P. The apparatus has proven especially useful in conjunction with a nozzle block supporting a squaring-off nozzle 47 and one or more beveling nozzles 48 supported so as to cut and double bevel the workpiece P during a single pass of the machine along the desired path of travel. The nozzle block may be spaced from the workpiece by means of a roller 49, and the block may float transversely with respect to the workpiece and relatively to the carriage C by employing a floating support or plate rider of the type disclosed in R. Chelborg and H. Pufahl patent application Serial No. 416,074, filed October 22, 1941. Such a structure comprises a guide bar 52, movable within a roller housing 53. The floating support may be urged in an upward direction, when the apparatus is performing overhead cutting, by using a tension spring 51 between the movable guide bar 52 and the housing 53. Valves 54 mounted on the plate-riding device control the flow of the respective gases to the nozzles 47 and 48.

A handle 55 extends upwardly from the base 23 to substantially surround and protect the motor 32 and governor 34. Preferably the handle 55 comprises a yoke-shaped section of tubing brazed or otherwise held at its ends within bosses 56 on the base 23. The handle besides providing a convenient means for carrying the carriage C also provides a material degree of protection to the motor and its related parts. A motor switch 57 may be mounted on the handle 55 so as to be located between the handle and the motor. This provision protects the switch against damage and against inadvertent operation.

The invention may be modified in various respects, as will be apparent to one skilled in the art, without departing from the principles of the invention or sacrificing its advantages.

I claim:

1. Tool-supporting and guiding apparatus comprising a track adapted to be located on the surface of a workpiece to define a path of travel thereon; a tool-supporting carriage movable along said track; and means on said track for adjustably bowing said track into a curve parallel to said surface.

2. Tool-supporting and guiding apparatus comprising a track adapted to be located on the surface of a workpiece to define a path of travel thereon, said track including a plate; means on said track for bowing said plate into a curve parallel to said surface; and a tool-supporting carriage having guide rollers co-operative with said plate to hold said carriage on said track.

3. Blowpipe apparatus comprising a track including a relatively long narrow plate, legs extending from said plate at spaced intervals and adapted to engage the work surface of a ferrous metal body at points along a predetermined path of travel, and adjustable means operative to arch said plate along its length into a curve parallel to said surface; and a self-propelled blowpipe-supporting carriage having rollers adapted to guide said carriage along said plate.

4. An arcuately-adjustable blowpipe carriage track comprising a relatively long narrow plate of flexible material such as wood or metal; legs extending from said plate at spaced intervals and adapted to engage the work surface of a ferrous metal body at points along a predetermined path of travel; and adjustable means operative to arch said plate along its length into a curve parallel to said surface.

5. A track as claimed in claim 4, including adjustable fastening means extending from said track member, for detachably securing said track to said ferrous metal body.

6. An arcuately adjustable blowpipe carriage track adapted to be disposed adjacent to a flat or curved work surface, said track comprising a generally flexible rail; supporting legs extending from said rail toward said surface at spaced intervals along said rail, said legs holding said rail in spaced relation to said surface; and adjustable arching means adapted to flex said rail into a curve parallel to said surface from a straight position to concave and convex positions respectively.

7. A track as claimed in claim 6, wherein said arching means comprises a longitudinally adjustable strut extending between adjoining legs.

8. An arcuately adjustable blowpipe carriage track adapted to be disposed adjacent to a flat or curved work surface, said track comprising a generally flexible rail; supporting legs extending from said rail toward said surface at spaced intervals along said rail, said legs holding said rail in spaced relation to said surface; adjustable arching means adapted to flex said rail into a curve parallel to said surface from a straight position to concave and convex positions respectively; and a flexible rack member extending along said track, said rack member being adapted to cooperate with a toothed drive member on such carriage to propel such carriage along said track.

9. An arcuately-adjustable blowpipe carriage track comprising a relatively long narrow plate of flexible material such as wood or metal; legs extending from said plate at spaced intervals and adapted to engage the work surface of a ferrous metal body at points along a predetermined path of travel; adjustable means operative on said legs to arch said plate along its length into a curve parallel to said member; a chain secured along said plate, said chain being adapted to cooperate with a drive sprocket on such carriage for propelling such carriage along said track; and tensioning means operative to maintain said chain taut as said chain accommodates itself to the shape of said arcuately adjustable plate.

10. Blowpipe apparatus comprising an arcuately-adjustable blowpipe carriage track adapted to be disposed adjacent to a flat or curved work surface, said track comprising a generally flexible rail, supporting legs extending from said rail toward said surface at spaced intervals along said rail, said legs holding said rail in spaced relation to said surface, and a chain secured along said rail and being adapted to conform to the shape of said flexible rail; and a blowpipe-supporting carriage detachably mounted on said rail, said carriage including a drive motor, transmission mechanism, and a drive sprocket rotatable by said mechanism, said sprocket being located so as to operatively engage said chain when said carriage is mounted on said rail to propel said carriage along said track.

11. Apparatus for supporting and propelling a tool such as a cutting or welding blowpipe along a plane and a curved work surface respectively, said apparatus comprising a track, including a relatively flexible rail, legs extending at spaced intervals from said rail for engagement with said surface so as to locate said rail in separated relation to said surface, and adjustable struts connecting adjoining legs for arching said rail into a curve parallel to said surface so as to shape said track to match said surface; a self-propelled tool carriage having supporting and driving wheels, and means for locking said wheels into operative engagement with said rail; and mounting means, such as rods, for firmly holding said track to said surface.

12. A track for guiding a tool-holding carriage along a surface of a workpiece, such track comprising a bendable rail engageable by at least one element of said carriage to guide the latter as it is propelled along said rail; and adjustable means carried by said track and operable both to bend said rail and thereby form a non-rectilinear guide for said carriage and to retain said rail in such bent position.

13. A track for guiding a tool-holding carriage along a surface of a workpiece, such track comprising a bendable rail engageable by at least one element of said carriage to guide the latter as it is propelled along said rail; means secured to said rail along one side thereof and adapted to engage said surface to space said rail therefrom; and means carried by said track and operable to bend said rail to adjust the latter into substantially parallel relation to said surface.

14. A track for guiding a motor-driven tool-holding carriage along a surface of a workpiece, such track comprising a bendable rail engageable by at least one element of said carriage to guide the latter as it is propelled along said rail; means along said rail adapted to cooperate with motor-driven means on said carriage, to propel said carriage along said rail; members secured to said rail at spaced intervals along one side thereof and adapted to engage said surface to space said rail therefrom; and means carried by said track and operable both to bend said rail to adjust the latter into substantially parallel relation to said surface and to retain said rail in such bent position.

15. A readily portable, easily mountable and demountable blowpipe track for furnishing a blowpipe support and guideway and for use with a conventional blowpipe member upon a carriage, which includes a flexible and adjustable track member of extended length to support and guide a carriage; spacing members adapted to space said track member a preselected substantially uniform and fixed distance from a concave, convex or straight worksurface; connective means connecting said spacing members and adapted to apply tensile or compressive forces thereto; adjustable means for applying varying tensile or compressive forces to said connective means thereby to flex said track member to a parallel position respective the worksurface; and holding means to hold said track member in place relative said worksurface.

16. A track as defined in claim 15 which additionally includes a flexible positive drive rack adapted to cooperate with a drive mechanism upon a blowpipe carriage, the said flexible rack being in relatively fixed but adjustable association with said track member so as to flex therewith.

17. A readily portable, easily mountable and demountable blowpipe track for furnishing a blowpipe support and guideway and for use with a conventional blowpipe member upon a carriage, which includes a track member of extended length to support and guide a blowpipe supporting carriage; spacing members of equal length carried by said track member adapted to space the latter a preselected substantially uniform and fixed distance from a straight worksurface; holding means to hold said track member in place relative said worksurface; and a positive drive rack associated with said track member adapted to cooperate with a drive mechanism upon a blowpipe carriage, thereby to provide a portable easily detachable positive track and guideway of extended length, said guideway being substantially parallel respective the worksurface.

18. In combination a blowpipe, a carriage having a drive means and adapted to support said blowpipe and a readily portable easily mountable and demountable blowpipe track for furnishing a support and guideway for said carriage; said track including a flexible and adjustable track member of extended length to support and guide said blowpipe supporting carriage; spacing members of equal length carried by said track member adapted to space the latter a preselected substantially uniform and fixed distance from a concave, convex or straight worksurface; connective means connecting said spacing members and adapted to apply tensile or compressive forces thereto; adjustable means for applying varying tensile or compressive forces to said connective means thereby to flex said track member to a parallel position respective the worksurface; and holding means to hold said track member in place relative said worksurface.

19. A combination as defined in claim 18 which additionally includes a flexible positive drive rack for cooperating with a drive member upon said carriage, said flexible rack being in relatively fixed but adjustable association with said track member so as to flex therewith.

20. A combination as defined in claim 18 which additionally includes a flexible positive drive rack for cooperating with a drive member upon said carriage, said flexible rack being in relatively fixed but adjustable association with said track member so as to flex therewith, and means to detachably and movably lock said carriage upon said track.

21. In combination a blowpipe, a carriage for said blowpipe and a readily portable easily mountable and demountable blowpipe track for furnishing a guideway for said carriage, said track including a track member of extended length to support and guide said blowpipe supporting carriage; spacing members of equal length carried by said track member adapted to space the latter a preselected substantially uniform and fixed distance from a straight worksurface, holding means to hold said track member in place relative said worksurface, and a positive drive rack associated with said track member adapted to cooperate with a drive mechanism upon said blowpipe carriage, thereby to provide a portable easily detachable positive track and guideway of extended length, said guideway being substantially parallel respecting the worksurface.

22. A combination as defined in claim 21 which additionally includes means to detachably and movably lock said carriage upon said track.

LLOYD W. YOUNG.